(12) United States Patent
Ogawa

(10) Patent No.: US 8,731,740 B2
(45) Date of Patent: May 20, 2014

(54) AUTOMATIC WAREHOUSE AND WAREHOUSING METHOD INTO AUTOMATIC WAREHOUSE

(75) Inventor: Kazuhiko Ogawa, Inuyama (JP)

(73) Assignee: Murata Machinery, Ltd., Kyoto (JP)

( * ) Notice: Subject to any disclaimer, the term of this patent is extended or adjusted under 35 U.S.C. 154(b) by 0 days.

(21) Appl. No.: 13/805,873

(22) PCT Filed: Feb. 8, 2011

(86) PCT No.: PCT/JP2011/052588
§ 371 (c)(1),
(2), (4) Date: Dec. 20, 2012

(87) PCT Pub. No.: WO2011/161979
PCT Pub. Date: Dec. 29, 2011

(65) Prior Publication Data
US 2013/0103248 A1 Apr. 25, 2013

(30) Foreign Application Priority Data
Jun. 21, 2010 (JP) .................................. 2010-140359

(51) Int. Cl.
*B65G 1/00* (2006.01)
(52) U.S. Cl.
USPC ................................................ 701/1; 701/23
(58) Field of Classification Search
USPC .................. 701/1, 23; 212/271; 414/265, 800
See application file for complete search history.

(56) References Cited

FOREIGN PATENT DOCUMENTS

| JP | 64-21110 U | 2/1989 |
| JP | 09-142617 A | 6/1997 |
| JP | 2001-10704 A | 1/2001 |
| JP | 2003-12117 A | 1/2003 |
| JP | 2003-89407 A | 3/2003 |
| JP | 2004-123240 A | 4/2004 |
| JP | 2004-359431 A | 12/2004 |

OTHER PUBLICATIONS

Official Communication issued in International Patent Application No. PCT/JP2011/052588, mailed on May 17, 2011.

*Primary Examiner* — Yonel Beaulieu
(74) *Attorney, Agent, or Firm* — Keating & Bennett, LLP

(57) ABSTRACT

An automatic warehouse includes multiple guided vehicles disposed at different heights along a rack and a storage shelf with a hoist in line with the rack. The storage shelf includes an intra-shelf conveyor that stores articles, and multiple shelf frames configured to vertically pass the transportation surface of the intra-shelf conveyor. The interval between the plurality of shelf frames may be varied. In parallel with the storage of articles using the intra-shelf conveyor, the shelf frames are caused to pass the transportation surface of the intra-shelf conveyor upward from below, and the articles are sequentially transferred from the intra-shelf conveyor onto the shelf frames. After the articles have been transferred to all the corresponding shelf frames, the guided vehicles store the articles on the shelf frames into the rack simultaneously.

8 Claims, 9 Drawing Sheets

AUTOMATIC WAREHOUSE AND WAREHOUSING METHOD INTO AUTOMATIC WAREHOUSE

BACKGROUND OF THE INVENTION

1. Field of the Invention

The present invention relates to an automatic warehouse and a method for storing articles in an automatic warehouse.

2. Description of the Related Art

JP 2004-359431A discloses an automatic warehouse provided with a shelf including an intra-shelf conveyor and multiple shelf frames vertically passing the transportation surface of the intra-shelf conveyor. The literature also discloses providing an ordinary shelf in addition to the shelf, and transporting articles between the shelf and that shelf using a stacker crane. This automatic warehouse, however, suffers from a lack of efficiency for storage and retrieval because articles are transported one by one between the shelf and the ordinary shelf using the stacker crane.

SUMMARY OF THE INVENTION

Accordingly, preferred embodiments of the present invention provide an automatic warehouse configured to store a large amount of articles in a short period of time and a method for storage in the automatic warehouse.

According to a preferred embodiment of the present invention, an automatic warehouse includes at least one rack including a plurality of stages; a plurality of guided vehicles disposed at different heights in a vertical direction and arranged to travel along the at least one rack to transport articles; a storage shelf with a hoist disposed in line with the at least one rack and including a intra-shelf conveyor and a plurality of shelf frames configured to vertically pass a transportation surface of the intra-shelf conveyor, the storage shelf with a hoist being configured to transfer the articles from the intra-shelf conveyor onto the plurality of shelf frames by causing the plurality of shelf frames to pass the transportation surface of the intra-shelf conveyor upward from below; a plurality of guided vehicle travelling paths extending from the rack to the storage shelf; and a controller configured and programmed to cause the plurality of guided vehicles to perform storage of the articles from the plurality of shelf frames into the rack in parallel.

Another preferred embodiment of the present invention provides a method for performing storage in an automatic warehouse including at least one rack including a plurality of stages; a plurality of guided vehicles disposed at different heights in a vertical direction and arranged to travel along the at least one rack to transport articles; a storage shelf disposed in line with the rack and including an intra-shelf conveyor and a plurality of shelf frames configured to vertically pass a transportation surface of the intra-shelf conveyor; a plurality of guided vehicle travelling paths extending from the rack to the storage shelf; and a controller configured and programmed to control the plurality of guided vehicles, the method including a step of transferring the articles from the intra-shelf conveyor onto the plurality of shelf frames by causing the plurality of shelf frames to pass the transportation surface of the intra-shelf conveyor upward from below; and a step of storing the articles from the plurality of shelf frames into the rack in parallel by the plurality of guided vehicles under control of the controller, after transferring the articles onto the plurality of shelf frames.

According to various preferred embodiments of the present invention, the articles are transferred from the intra-shelf conveyor onto the shelf frames, and the plurality of guided vehicles simultaneously transport the articles from the shelf frames to the rack. Accordingly, a large amount of articles may be stored in a short period of time.

Preferably, the intra-shelf conveyor includes a plurality of serial conveyors. For example, when a single article is placed on each conveyor and the articles are transferred to the shelf frames, a space is naturally created between the articles, which facilitates the transfer to the guided vehicles. Furthermore, by providing a stopper configured to extend and retract between the plurality of serial conveyors and positioning the articles by the stopper, the guided vehicles may load the articles more easily.

Particularly preferably, each of the plurality of serial conveyors includes a plurality of conveyor belts disposed in parallel in a horizontal plane and in a direction perpendicular or substantially perpendicular to a transporting direction of the conveyor, and the plurality of shelf frames each include a bar disposed between the conveyor belts disposed in parallel. Since the conveyor belt tends not to disturb the posture of articles, articles having various sizes may be accurately stored in the rack without using a carrier such as a pallet. Furthermore, disposing the bars of the shelf between the parallel conveyor belts allows the plurality of shelf frames to vertically pass the transportation surface of the intra-shelf conveyor. Note that it is possible that an intra-shelf conveyor constituted by a roller conveyor is used in place of this intra-shelf conveyor and a comb-shaped shelf passes between the rollers. However, with the use of the roller conveyor, articles skid on the rollers and thus their postures tend to be disturbed.

Further preferably, the guided vehicles each include a pair of transfer devices, one of which being a fixed transfer device whose position along a travelling direction of the guided vehicles is fixed, the other of which being a sliding transfer device configured to be slidable along the travelling direction of the guided vehicles, and each of the transfer devices being provided with an arm coming into contact with the articles, and the fixed transfer device is disposed on a back side and the sliding transfer device is disposed on a front side, along the transporting direction in the intra-shelf conveyor of the storage shelf. Each of the transfer devices preferably includes a slide fork, a SCARA (Selective Compliance Assembly Robot Arm) arm, or the like, for example. When the back side of articles is positioned along the transporting direction of the intra-shelf conveyor and the sliding transfer device is caused to slide in alignment with the other end of the articles, the articles may be reliably loaded onto the guided vehicles even if the sizes of the articles are different. Moreover, only one of the transfer devices needs to be configured as a sliding transfer device.

Preferably, the automatic warehouse further includes a retrieval shelf with a hoist disposed in line with the rack and including a single intra-shelf conveyor and a plurality of shelf frames configured to vertically pass a transportation surface of the intra-shelf conveyor, wherein the retrieval shelf with a hoist is configured to transfer the articles from the plurality of shelf frames onto the intra-shelf conveyor by causing the plurality of shelf frames to pass the transportation surface of the single intra-shelf conveyor downward from above, and the controller is configured and programmed to cause the plurality of guided vehicles to perform retrieval of the articles from the rack to the plurality of shelf frames of the retrieval shelf in parallel. This configuration makes it possible to rapidly retrieve articles from the retrieval shelf having a simple structure.

Also preferably, a lifter configured to individually retrieve the articles from each of the stages of the rack is further provided. This makes it possible to individually retrieve articles as needed.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
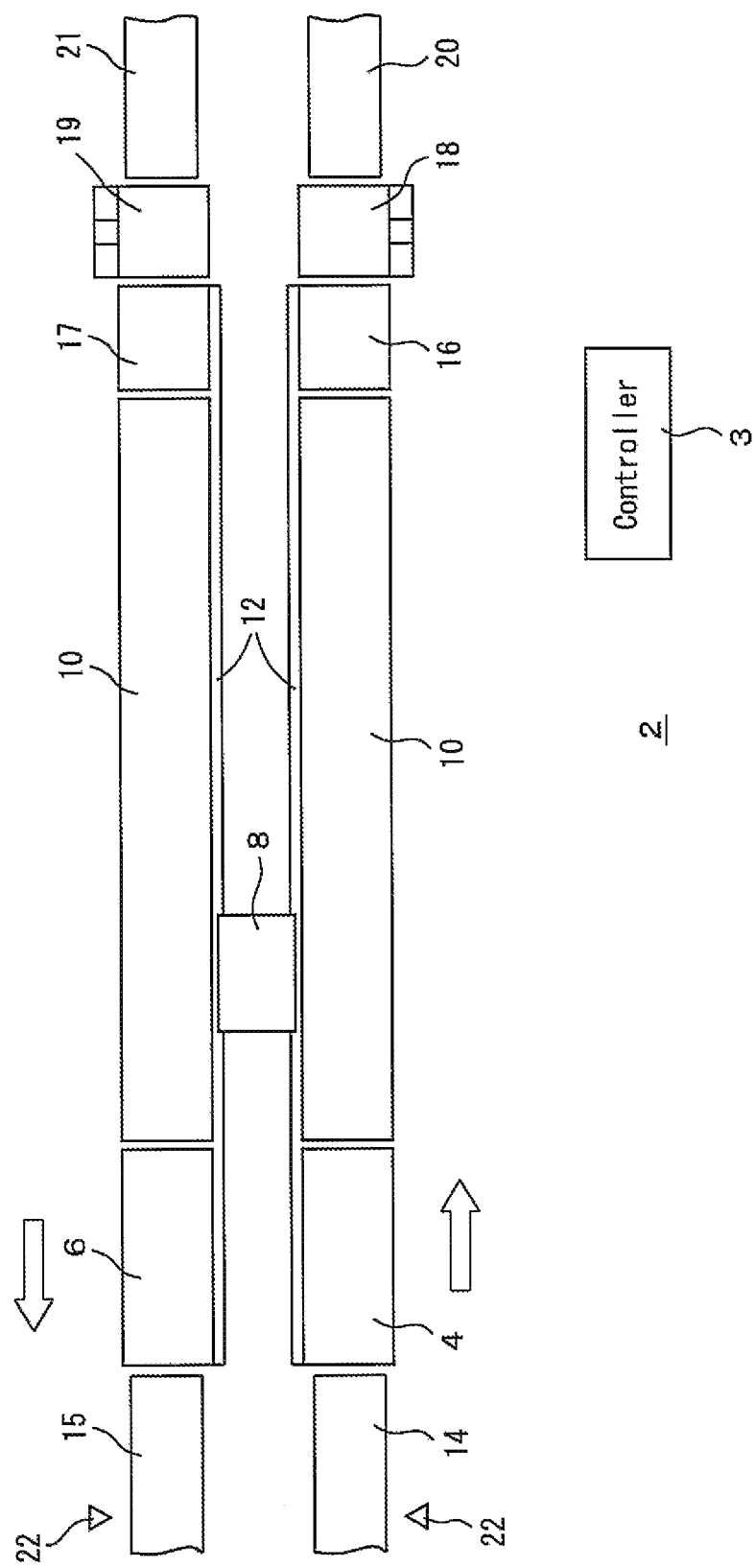
FIG. 1 is a plan view of a relevant portion of an automatic warehouse according to a preferred embodiment of the present invention.

Hereinafter, preferred embodiments for carrying out the present invention will be described. The scope of the present invention should be construed according to the understanding of those skilled in the art based on the description of various preferred embodiments of the claimed invention and techniques well known in this technical field.

A preferred embodiment and modifications thereof are shown in FIGS. 1 to 10. In the drawings, numeral 2 denotes an automatic warehouse, numeral 3 denotes a controller for the automatic warehouse 2, numeral 4 denotes a storage shelf, and numeral 6 denotes a retrieval shelf with a hoist. For example, a pair of racks 10 are preferably provided adjacent to the shelves 4 and 6 in the longitudinal direction. The racks 10 preferably are multi-stage shelves, and a guided vehicle 8 is disposed for each stage, and travels along rails 12. A storage conveyor 14 is connected to the storage shelf 4, whereas a retrieval conveyor 15 is connected to the retrieval shelf 6, and thereby articles are transported into and out of the shelves 4 and 6. In addition, for example, a pair of lifter conveyors 16 and 17 are provided on the side opposite from the shelves 4 and 6 in the longitudinal direction of the racks 10, and lifters 18 and 19 arranged to lift and lower articles between the ground and each stage of the shelf 6 are connected to the conveyors 16 and 17. Numerals 20 and 21 denote conveyors connected to the lifters 18 and 19, respectively.

Numeral 22 denotes a bar code reader, which reads the bar codes of articles on the conveyors 14 and 15, or on the conveyors located in the shelves 4 and 6. The bar code reader 22 may be replaced by an RFID reader, which reads data such as an RFID tag, for example. Alternatively, the length of articles in the longitudinal direction in FIG. 1 (the transporting direction in the present preferred embodiment), for example, may be determined by detecting the size of articles using a photoelectric sensor, a CCD camera, or the like, for example. Note that a single shelf may be provided in place of the pair of racks 10, and the storage shelf 4 may be used both for storage and retrieval, with the retrieval shelf 6 omitted. Furthermore, the lifters 18 and 19 do not need to be provided. Moreover, the guided vehicle 8 may be omitted for the lowest shelf of the racks 10, and the lowest shelf may be accessed directly by another transportation device such as an automatic guided vehicle without using the shelves 4 and 6. The "longitudinal direction" as used herein refers to the longitudinal direction of the shelves 4 and 6 and the racks 10, i.e., the direction in which articles are transported into and out of these components, and therefore, the longitudinal direction is also referred to as "transporting direction".

Figure 2:
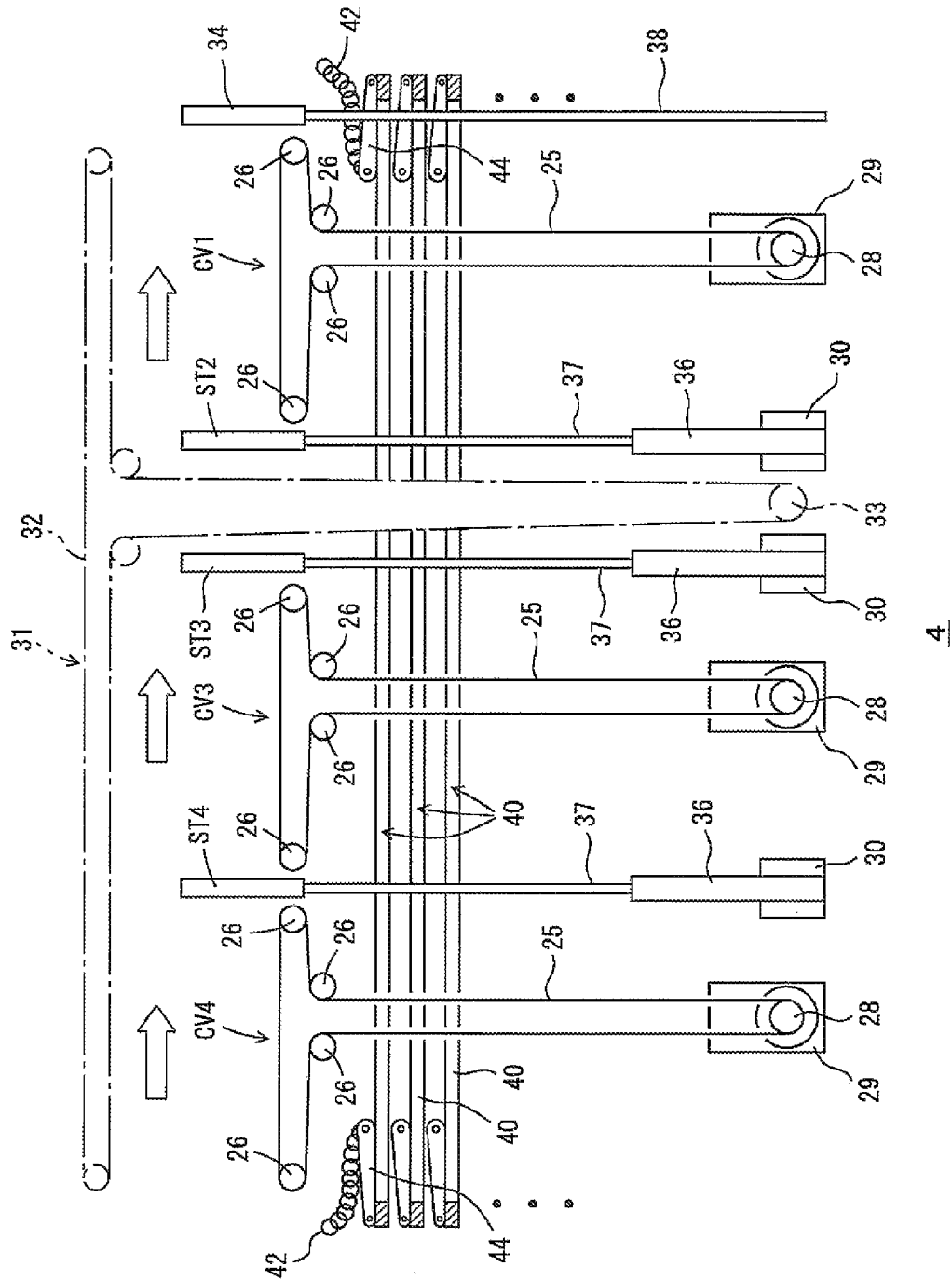
FIG. 2 is a vertical cross-sectional view of a relevant portion of a storage shelf according to a preferred embodiment of the present invention.
Figure 3:
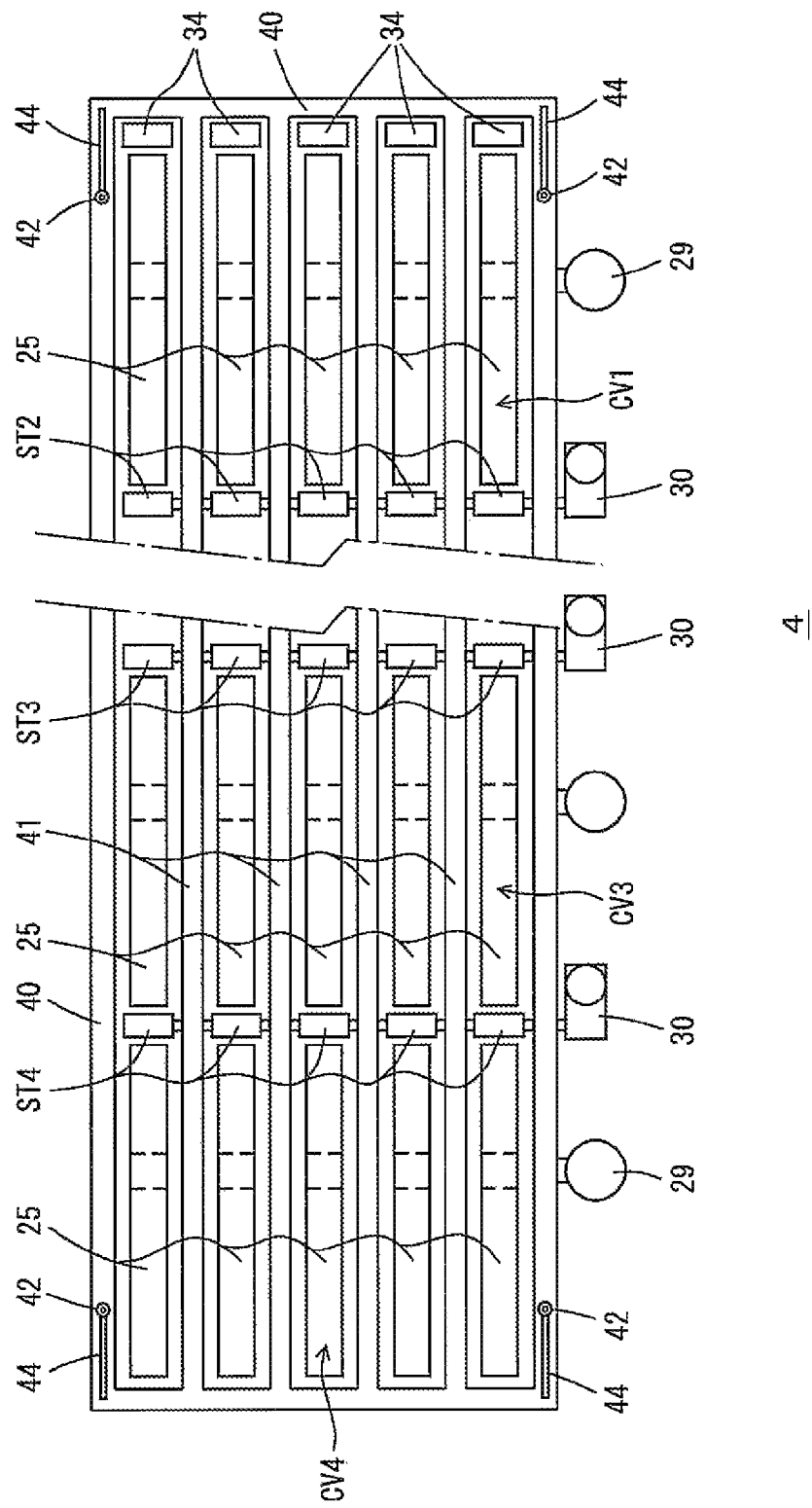
FIG. 3 is a partial cutaway plane view of the shelf according to a preferred embodiment of the present invention.

FIGS. 2 and 3 show the structure of the storage shelf 4. In the storage shelf 4, four conveyors CV1 to CV4, for example, preferably are connected in series, for example, with CV1 disposed on the rack 10 side and CV4 disposed on the conveyor 14 side. The conveyors CV1 to CV4 are operated independently under the control of the controller 3. Movable stoppers ST2 to ST4 configured to vertically extend and retract are provided between the conveyors CV1 to CV4, and a fixed stopper 34 is provided between the leading conveyor CV1 and the rack 10. The conveyors CV1 to CV4 each preferably include, for example, three to eight strips of parallel belts 25. Numeral 26 denotes an idler pulley. The belts 25 are pulled out downward in a vertical direction, and the three to eight strips of belts are driven in parallel by a drive pulley 28 and a motor 29 for each of the conveyors CV1 to CV4. The movable stoppers ST2 to ST4 vertically extend and retract with respect to the transportation surfaces of the conveyors CV2 to CV4 in the gaps between the conveyors CV2 to CV4, and are lifted and lowered via arms 37 preferably by compressors 30 and air cylinders 36. Numeral 38 denotes an arm that supports the fixed stopper 34 from the basal side of the shelf 4.

As shown in FIG. 3 bars 41 of the shelf frame 40 of each stage are provided between, for example, five strips of parallel belts 25, multiple shelf frames 40 are stacked one on top of the other, and connected to each other, for example, with a chain 42 and a connector 44. The upper end of the chain 42 is taken-up and paid-out by a drive device (not shown). The shelf frames 40 are stacked in such a manner that the take-up causes the shelf frames 40 to pass the transportation surfaces of the conveyors CV1 to CV4 upward from below, and the pay-out causes the shelf frames 40 to pass the transportation surfaces of the conveyors CV1 to CV4 downward from above. When the shelf frames 40 are passing the transportation surfaces upward from below, the articles on the conveyors CV1 to CV4 are scooped up. At that time, the articles are positioned so as to be in contact with the fixed stoppers 34 and the movable stoppers ST2 to ST4. Also, the fixed stoppers 34 and the movable stoppers ST2 to ST4 are divided into multiple sets, each corresponding to the same belt 25, and are disposed in the gaps between the bars 41 as with the belts 25. Note that the fixed stoppers 34 may alternately be disposed outward to the right of the shelf frames 40 in FIG. 3. The number of the divided sets of the stoppers ST2 to ST4 may be less than the number of strips of the belts 25. Further, the stoppers ST2 to ST4 may horizontally extend and retract between the conveyors CV1 to CV4.

The structure of the retrieval shelf 6 is indicated by the dashed dotted line in FIG. 2. Numeral 31 denotes a single conveyor, and numeral 32 denotes its belt. The belt 32 is depicted as being vertically longer than in actuality in order to be shown in a position displaced from the storage shelf 4. A single conveyor 31 is provided in a retrieval shelf, and, accordingly, the movable stoppers ST2 to ST4 are not provided. The retrieval shelf 6 is similar to the storage shelf 4 in that the bars 41 of the shelf frames 40 pass upward and downward between multiple strips of belts 31. In the case of the retrieval shelf 6, articles are transferred to conveyors (not shown) when the shelf frames 40 are lowered. Although conveyor belts, which tend not to disturb the posture of articles because of their large friction with the articles, are preferably used as the conveyors in the shelves 4 and 6 in the present preferred embodiment, a roller conveyor or the like may be alternatively used, for example. In this preferred embodiment, it is particularly preferable to use a conveyor belt for the storage shelf 4 because articles of various sizes are stored in and retrieved from the racks 10 without using a carrier such as a pallet.

Figure 4:
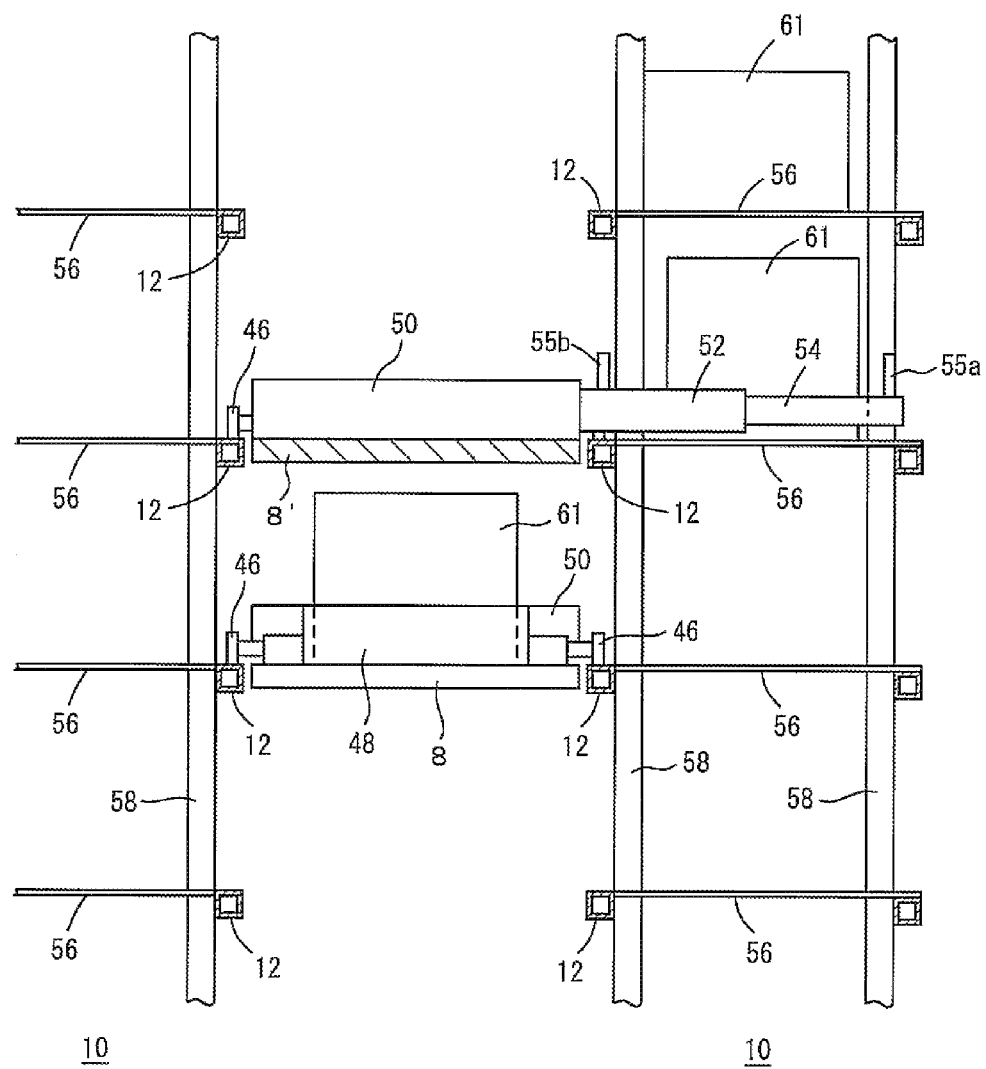
FIG. 4 is a front view of a relevant portion of racks and a guided vehicle according to a preferred embodiment of the present invention.
Figure 5:
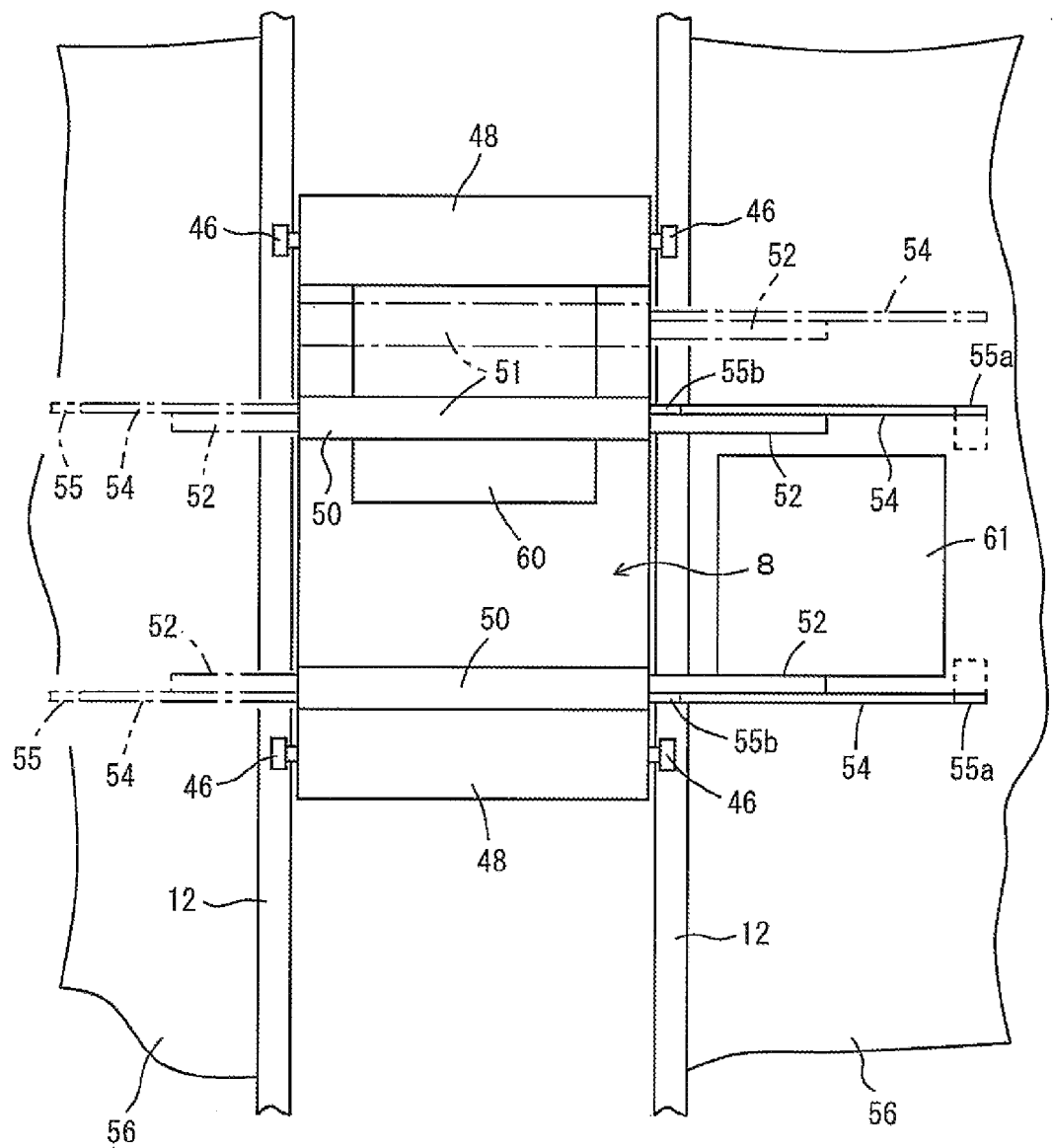
FIG. 5 is a plan view of the guided vehicle according to a preferred embodiment of the present invention.

FIGS. 4 and 5 show guided vehicles 8 and 8' configured to travel on travelling paths between the racks 10. The guided vehicles 8 and 8' travel on the rails 12, for example, with four driving wheels 46, but any number of the driving wheels 46 may be provided. In addition to the driving wheels 46, following wheels coming into contact with the upper surfaces of the rails 12, or guide rollers coming into contact with the side surfaces of the rails 12 may be provided, for example. Numeral 48 denotes a travelling device preferably including a travelling motor, a speed reducer, and so on, for example. Numeral 50 denotes a fixed transfer device, and numeral 51 denotes a sliding transfer device. Each of the transfer devices preferably includes a slide fork, a SCARA arm, or the like, and also preferably includes an arm configured to advance and withdraw to come into contact with articles. The fixed transfer device 50 is disposed at the back of the guided vehicles 8 and 8' and the sliding transfer device 51 is disposed at the front of the guided vehicles 8 and 8', along the transporting direction of the conveyors CV1 to CV4. In this preferred embodiment, slide forks each including a base unit, a middle unit 52, and a top unit 54 are provided as the transfer devices 50 and 51. Furthermore, hooks 55a and 55b configured to pivot 90 degrees about a horizontal axis to assume a state in which they are directed vertically upward and a state in which they are directed between the top units 54 are provided, for example, at opposite ends of each of the top units 54.

The fixed transfer device 50 is fixed to the guided vehicle 8, and the sliding transfer device 51 may be caused to slide within a predetermined stroke range along the travelling direction of the guided vehicle 8 by an advancing and retracting device 60. The sliding length of the sliding transfer device 51 is set in accordance with the length of an individual article 61 in the transporting direction. Also, the guided vehicle 8 and the rails 12 are provided for each stage (a group of cells disposed on the same horizontal plane) of the rack 10. Numeral 56 denotes a shelf plate arranged to support the article 61, and numeral 58 denotes a strut of the rack 10. The article 61 is, for example, a cardboard box. When the article 61 is moved to the rack 10, the article is pushed by the hook 55b located at the front side. When the article 61 is brought into the guided vehicle 8 from the rack 10, the article is pushed by the hook 55a located at the back side. Note that the article may be transferred by being sandwiched between the top units 54, without the provision of the hooks 55a and 55b.

Figure 6:
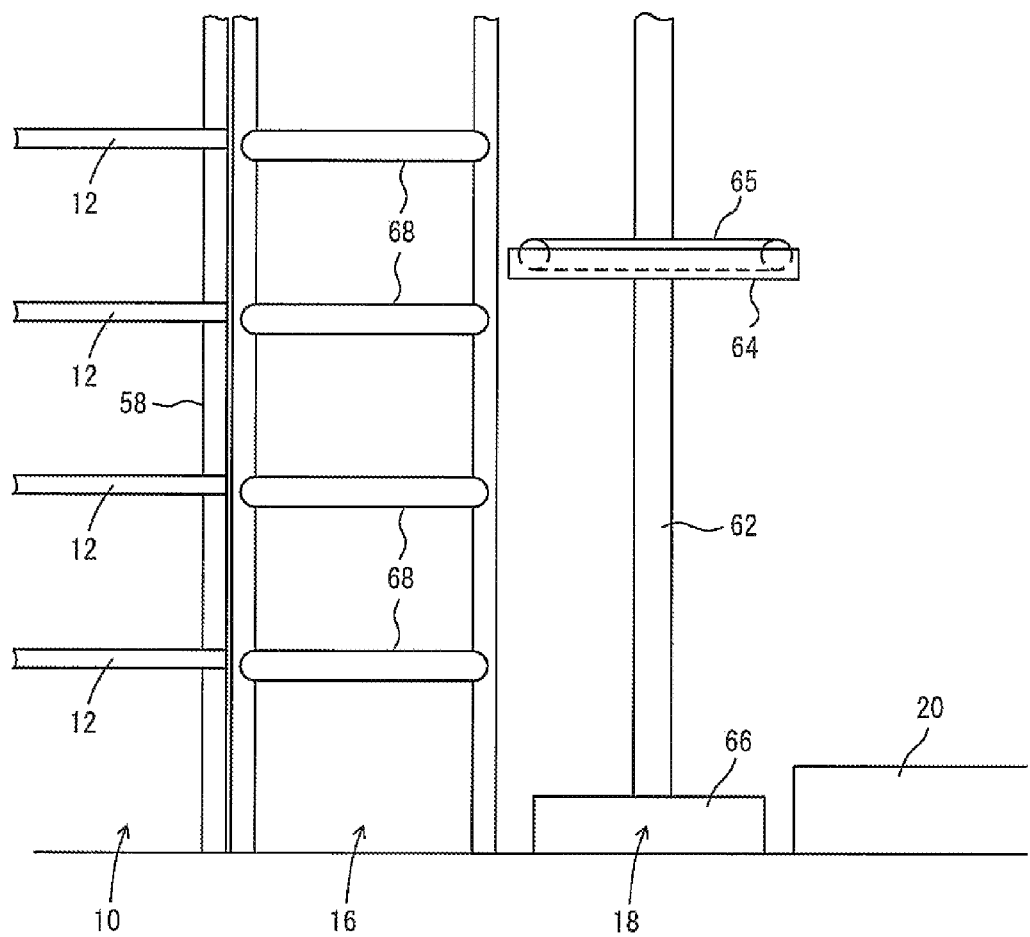
FIG. 6 is a side view of an individual lifter and the surrounding area thereof according to a preferred embodiment of the present invention.

FIG. 6 shows a relationship between the lifter 18 and the rack 10, which relationship also applies to the lifter 19. Numeral 66 denotes a driver of the lifter 18. An elevation platform 64 is lifted and lowered along the mast 62, and a conveyor 65 is mounted on the elevation platform 64. Thus, articles are stored and retrieved between the individual conveyor 68 of each stage of the conveyor 16 and the conveyor 20 on the ground. Further, the conveyor 16 is connected to the rack 10. The individual articles 61 are stored and retrieved one by one using the lifters 18 and 19. Note that, for example, only a single lifter 18 may be provided, in place of a pair of lifters 18 and 19.

Figure 7:
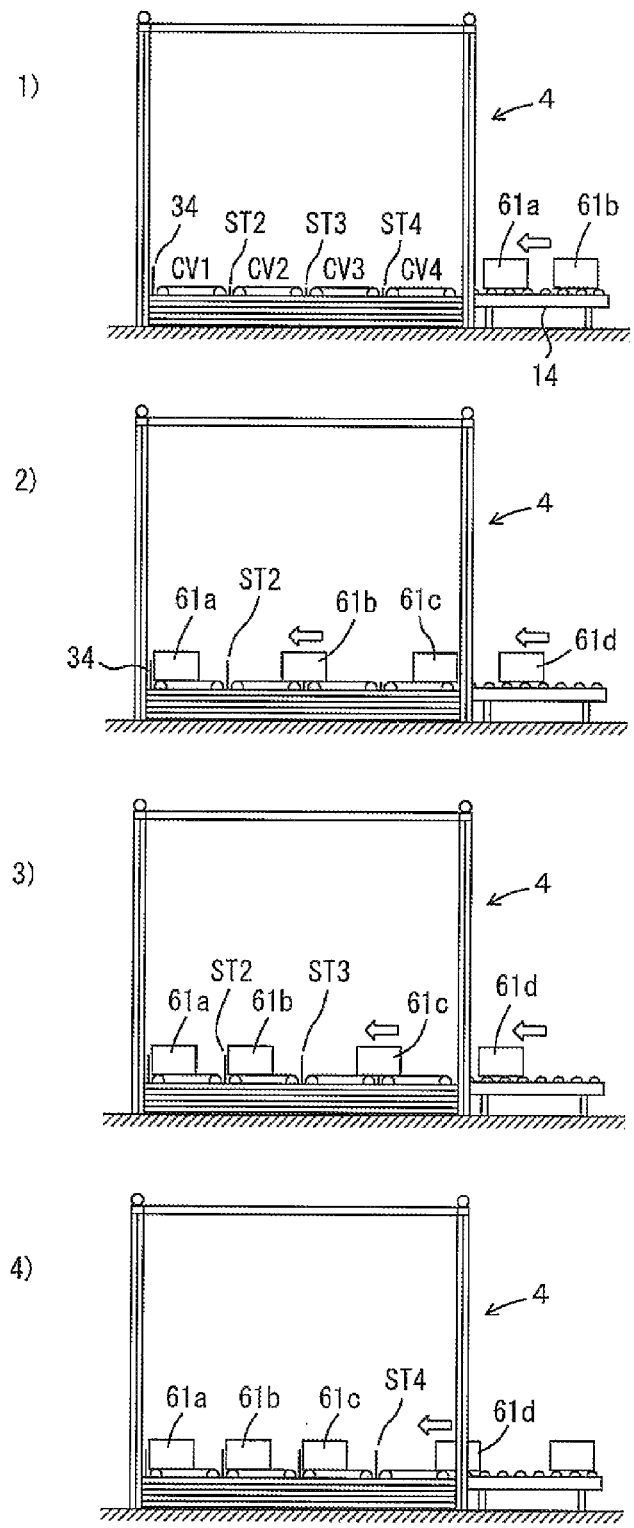
FIG. 7 schematically shows the storage of articles in the storage shelf in a preferred embodiment of the present invention, with 1) showing a state of the storage shelf before the articles are stored, 2) showing a state in which the second article is being stored, 3) showing a state in which the third article is being stored, and 4) showing a state in which the fourth article is being stored.
Figure 8:
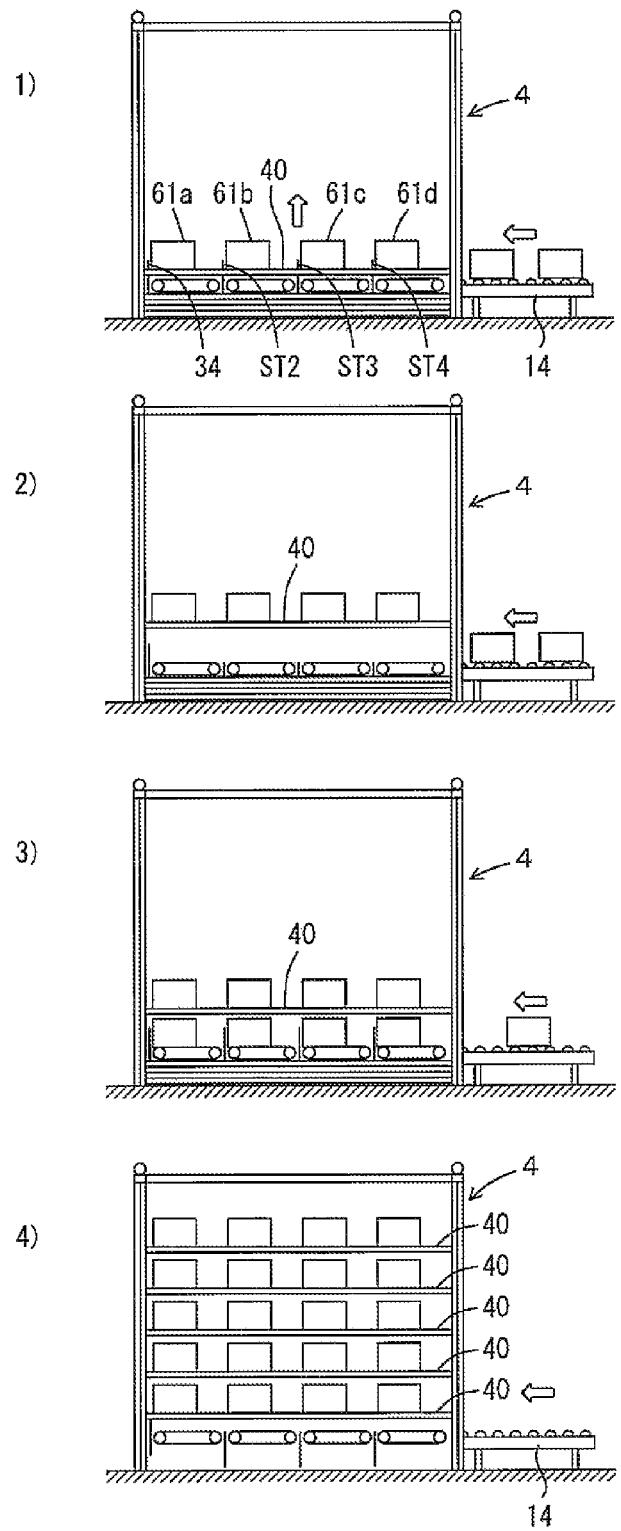
FIG. 8 schematically shows the storage of articles in the storage shelf in a preferred embodiment of the present invention, with 1) showing a state in which the first shelf frame is being lifted, 2) showing a state after the first shelf frame has been lifted, 3) showing a state in which the storage of the articles for the second shelf frame has been completed, and 4) showing a state in which the storage in all the shelf frames has been completed.
Figure 9:
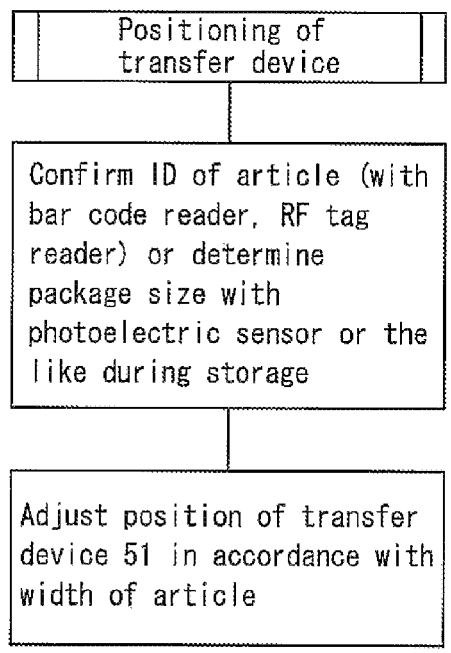
FIG. 9 is a flowchart showing an algorithm for positioning a transfer device according to a preferred embodiment of the present invention.
Figure 10:
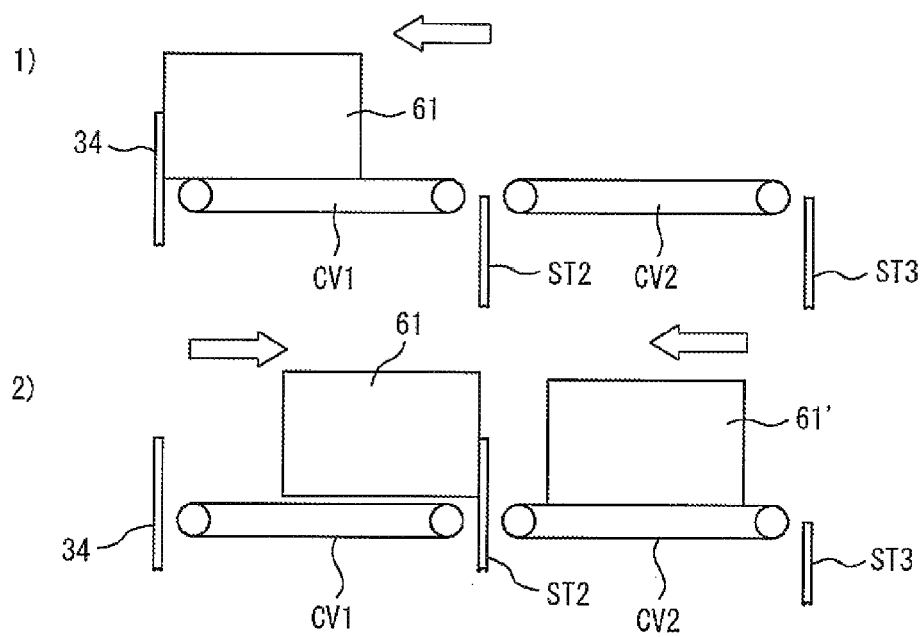
FIG. 10 shows a positioning according to a modification of a preferred embodiment of the present invention in which the storage direction for the storage shelf is opposite to that of the preferred embodiment, with 1) showing that an article is transported with conveyors until it comes into contact with a stopper, and 2) showing that, after the article has come into contact with the stopper, the conveyors are driven in the reverse direction, and the article is positioned by a stopper located on the opposite side.

FIGS. 7 to 9 show storage of articles from the storage shelf 4 into the rack 10. As shown in 1) in FIG. 7, articles 61a and 61b are transported from the storage conveyor 14 into the conveyors CV1 to CV4 of the storage shelf 4. The storage shelf 4 is provided, for example, at its entrance on the storage conveyor 14 side, with a photoelectric sensor or the like (not shown). The conveyor CV4 is activated upon detection of the front edge of an article, and the storage conveyor 14 is stopped by the controller 3 upon detection of the rear edge of the article, thus isolating the plurality of articles from one another. A sensor such as a photoelectric sensor is also provided at the front of each of the stoppers 34 and ST2 to ST4 to monitor the front and rear edges of the articles. When it is detected that the article 61a has reached the position of the fixed stopper 34, the conveyor CV1 is stopped and the movable stopper ST2 is lifted, as shown in 2) in FIG. 7. Note that after waiting for a predetermined time using a timer after detecting the rear edge of an article by a sensor provided at the tip of the conveyor CV2, the conveyor CV1 may be stopped and the movable stopper ST2 may be lifted.

Thereafter, similarly, when it is detected that the article 61b has reached the tip of the conveyor CV2, or when a time set by the timer has passed after detection of the rear edge of an article by the sensor of the conveyor CV3, the conveyor CV2 is stopped and the stopper ST3 is lifted (3) in FIG. 7). The same processing is also performed for the articles 61c, 61d, the conveyors CV3, CV4, and the stoppers ST3 and ST4 (4) in FIG. 7, 1) in FIG. 8). In the above-described manner, when the articles 61a to 60d for a single shelf frame 40 have been aligned on the conveyors CV1 to CV4, the shelf frame 40 is lifted and the articles are scooped up from the conveyors CV1 to CV4 (2), 3) in FIG. 8). At this time, the stoppers ST2 to ST4 are retained at a high position until the shelf frame 40 has passed the stoppers ST2 to ST4, so as to position the articles 61 in a more reliable manner. The same processing is repeated for each of the shelf frames 40. Upon completion of delivery of the articles to all the shelf frames (4) in FIG. 8), the articles are transferred from the shelf 4 to the rack 10 by the guided vehicle 8 for each stage in parallel.

FIG. 9 shows an algorithm for positioning the transfer device 51. Although the lengths of the articles 61 in the transporting direction differ from one another, the guided vehicle 8 is stopped at the storage shelf 4 such that the fixed transfer device 50 is located at a position relative to the stoppers 34 and ST2 to ST4. Further, the guided vehicle 8 is stopped at the rack 10 such that the fixed transfer device 50 is located at a predetermined position relative to the cells in the rack 10. During storage in the storage shelf 4, the part numbers of the articles 61 are determined from the IDs of the articles, such as a bar code or an RFID, for example, to determine the lengths of the articles 61 (the length along the transporting direction), and the determined lengths are stored by the controller 3. Then, the advancing and retracting device 60 causes the transfer device 51 to slide to a position suitable for transferring the articles 61 by the pair of top units 54. Note that the length of the articles 61 may also be determined from, for example, the packing mode of the articles 61. In the above-described manner, the articles 61 having various lengths may be stored and retrieved by sliding only the sliding transfer device 51 and stopping the guided vehicle 8 such that the fixed transfer device 50 is located at a predetermined position relative to the storage shelf 4 and the rack 10. Note that both of the transfer devices 50 and 51 may be configured to be slidable. In the case where the articles have a fixed length, both of the transfer devices 50 and 51 may be fixed.

During retrieval from the rack 10, the guided vehicle 8 is stopped such that the fixed transfer device 50 is located at a predetermined position relative to the cells, and the transfer device 51 is caused to slide in accordance with the lengths of the articles 61 stored by the controller 3. Then, with the hooks 55a and 55b directed upward, the top units 54 are advanced and subsequently retracted, thus pulling the articles 61 onto the guided vehicle 8. The articles 61 are offloaded from the guided vehicle 8 to the shelf frame 40 so as to prevent the articles from interfering with one another in the retrieval shelf 6. When the articles for all the shelf frames 40 of the shelf 6 have been transported, the shelf frames 40 are lowered and the articles are retrieved from the conveyor 31 to the retrieval conveyor 15.

Storage shelves 4 may also be provided on the right and left sides of the rack 10 in FIG. 1. In that case, in the shelf on the right side in FIG. 1, the position of an article 61 on the transfer device 51 side is determined by the stoppers 34, and ST2 to ST4. Accordingly, as shown in 1) in FIG. 10, the article 61 is moved until it reaches the stopper 34. Then, as shown in 2), the stopper ST2 is lifted, and at the same time, the conveyor CV1 is reversed, and consequently, the article 61 is positioned by the stopper ST2. Likewise, an article 61' and so on are positioned relative to the stopper ST3 and so on.

The above preferred embodiment provides advantages including the following.

1) Articles having different sizes may be stored and retrieved.

2) A large amount of articles may be stored and retrieved in a short period of time by the shelves 4 and 6 and the guided vehicles 8 provided for the respective stages.

3) Since articles are positioned by the stoppers ST2 to ST4, the loading of the articles into the guided vehicle 8 may be easily performed.

4) The loading of articles into the guided vehicle 8 may be performed even if only the transfer device 51 is configured to be slidable, with the transfer device 50 being fixed.

5) The retrieval shelf 6 may have a simple structure including only a single conveyor 31, but not including individual conveyors CV1 to CV4 and movable stoppers ST2 to ST4.

6) The lifters 18 and 19 are suitable to store and retrieve articles one by one for urgent storage and retrieval.

While the articles 61 are preferably placed on all positions on the shelf frames 40 in the storage shelf 4 in the above-described preferred embodiment, the articles 61 may be stored in the rack 10 from a state in which some positions or some of the shelf frames 40 are vacant.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An automatic warehouse comprising:
at least one rack including a plurality of stages;
a plurality of guided vehicles disposed at different heights in a vertical direction and arranged to travel along the at least one rack to transport articles;
a storage shelf with a hoist disposed in line with the at least one rack and including an intra-shelf conveyor and a plurality of shelf frames configured to vertically pass a transportation surface of the intra-shelf conveyor, the storage shelf being configured to transfer the articles from the intra-shelf conveyor onto the plurality of shelf frames by causing the plurality of shelf frames to pass the transportation surface of the intra-shelf conveyor upward from below;
a plurality of guided vehicle travelling paths extending from the at least one rack to the storage shelf; and
a controller configured and programmed to cause the plurality of guided vehicles to perform storage of the articles from the plurality of shelf frames into the at least one rack in parallel.

2. The automatic warehouse according to claim 1, wherein the intra-shelf conveyor includes a plurality of serial conveyors.

3. The automatic warehouse according to claim 2, further comprising a stopper configured to extend and retract between the plurality of serial conveyors.

4. The automatic warehouse according to claim 3, wherein each of the plurality of serial conveyors includes a plurality of conveyor belts disposed in parallel or substantially in parallel in a horizontal plane and in a direction perpendicular or substantially perpendicular to a transporting direction of the conveyor, and the plurality of shelf frames include a bar disposed between the conveyor belts disposed in parallel or substantially in parallel.

5. The automatic warehouse according to claim 1, wherein the guided vehicles include a pair of transfer devices, one of which being a fixed transfer device whose position along a travelling direction of the guided vehicles is fixed, the other of which being a sliding transfer device configured to be slidable along the travelling direction of the guided vehicles, and each of the transfer devices being provided with an arm arranged to come into contact with the articles, and the fixed transfer device is disposed on a back side and the sliding transfer device is disposed on a front side, along the transporting direction in the intra-shelf conveyor of the storage shelf.

6. The automatic warehouse according to claim 1, further comprising a retrieval shelf with a hoist disposed in line with the at least one rack and including a single intra-shelf conveyor and a plurality of shelf frames configured to vertically pass a transportation surface of the intra-shelf conveyor, wherein the retrieval shelf is configured to transfer the articles from the plurality of shelf frames onto the intra-shelf conveyor by causing the plurality of shelf frames to pass the transportation surface of the single intra-shelf conveyor downward from above, and the controller is configured and programmed to cause the plurality of guided vehicles to perform retrieval of the articles from the rack to the plurality of shelf frames of the retrieval shelf in parallel.

7. The automatic warehouse according to claim 1, further comprising a lifter configured to individually retrieve the articles from each of the stages of the rack.

8. A method for performing storage in an automatic warehouse including at least one rack including a plurality of stages, a plurality of guided vehicles disposed at different heights in a vertical direction and arranged to travel along the at least one rack to transport articles, a storage shelf with a hoist disposed in line with the rack and including an intra-shelf conveyor and a plurality of shelf frames configured to vertically pass a transportation surface of the intra-shelf conveyor, a plurality of guided vehicle travelling paths extending from the rack to the storage shelf, and a controller configured and programmed to control the plurality of guided vehicles, the method comprising the steps of:

transferring the articles from the intra-shelf conveyor onto the plurality of shelf frames by causing the plurality of shelf frames to pass the transportation surface of the intra-shelf conveyor upward from below; and storing the articles from the plurality of shelf frames into the rack in parallel by the plurality of guided vehicles under control of the controller, after transferring the articles onto the plurality of shelf frames.

* * * * *